United States Patent [19]
Pageaud et al.

[11] Patent Number: 5,372,056
[45] Date of Patent: Dec. 13, 1994

[54] METHOD FOR THE MANUFACTURE OF A FOIL CAPACITOR

[75] Inventors: Michel Pageaud, Seurre; Nicolas Chapas, Navenne, both of France

[73] Assignee: Compagnie Europeenne De Composants Electroniques LCC, Courbevoie, France

[21] Appl. No.: 973,977

[22] Filed: Nov. 9, 1992

[30] Foreign Application Priority Data

Nov. 22, 1991 [FR] France ................... 91 14410

[51] Int. Cl.⁵ ............................................. B26D 1/00
[52] U.S. Cl. ........................................ 83/13; 29/25.42; 83/676
[58] Field of Search ............. 29/25.42; 361/323, 324; 83/676, 13

[56] References Cited

U.S. PATENT DOCUMENTS 4,069,729  1/1978  Kuts ................... 83/676 X

FOREIGN PATENT DOCUMENTS 8513383  2/1986  Germany.
3822180  1/1990  Germany.
1264804  1/1990  Japan.

OTHER PUBLICATIONS

Noguchi, et al., Method and Device of Cutting Building Stone, Oct. 23, 1989. JP1264804 (English abstract).
Senichi, et al., Manufacture of Laminated Film Capacitor, Dec. 19, 1990. JP2305423 (English abstract).

Primary Examiner—Carl E. Hall
Attorney, Agent, or Firm—Oblon, Spivak, McClelland, Maier & Neustadt

[57] ABSTRACT

In a method for the manufacturing or a foil capacitor, cut out into unit blocks by a circular saw blade from a capacitive strip, the saw blade rotates about an axis passing through a point of rotation that is offset with respect to the center of the saw blade. The method can be applied to the manufacture of capacitors with metallized dielectric films.

10 Claims, 4 Drawing Sheets

METHOD FOR THE MANUFACTURE OF A FOIL CAPACITOR

BACKGROUND OF THE INVENTION

1. Field of the Invention

The present invention relates to a method for the manufacture of a foil capacitor, cut out into unit blocks from a capacitive strip made by the stacking or coiling of metallized dielectric films.

2. Discussion of the Background

The manufacture of foil capacitors out of metallized dielectric films is known. Generally, plastic films are used, comprising a metallized zone and a non-metallized side margin. Two films are superimposed, their non-metallized side margins being on opposite sides in order to obtain a pair of films constituted by an even-order film and an odd-order film. At least one pair of metallized films is wound in a determined number of turns around a large-diameter wheel. There is thus obtained a capacitive strip, known as a parent capacitor, comprising alternating even-order and odd-order layers. Then, each of the flanks of the capacitive strip is covered with a metal (or alloy) in order to make output plates. Each output plate enables the same-order layers to be connected to one another mechanically and electrically. This operation, which is done by the spraying of molten metal, is known as Schooping or Schoop's metal spraying process. The process is completed by cutting the capacitive strip out into unit blocks which are generally parallelepiped shaped. Then the connection strands are soldered, if necessary, to the output plates and, optionally, the capacitor is covered with a protective coating, made of epoxy resin for example.

This operation of cutting out into unit blocks is always difficult in view of the small thickness of the metallized films (some microns) and sometimes leads to surface deterioration of the cut sides of the blocks.

The cutting out is done with a circular saw blade rotating about an axis that passes through its center. Its diameter is far greater than the thickness of the capacitive strip to be cut. The saw blade engages and penetrates the capacitive strip transversally, i.e. substantially perpendicularly to the plates. The rotational axis of the saw blade is located substantially in the median plane of the capacitive strip.

When they are damaged, the cut flanks of the blocks may be the site of short-circuits between an even-order layer and an odd-order layer. These short-circuits are created by the splinters or chips that are cut free by the teeth of the saw blade. This process of the cutting free of splinters harms the cut surface. The short-circuits damage the electrical properties of the capacitor which may even become unusable.

SUMMARY OF THE INVENTION

The present invention is aimed at overcoming this drawback by proposing a method for the manufacture of a foil capacitor out of a capacitive strip cut into unit blocks. This method does not damage the cut faces of the unit block.

The present invention proposes a method for the manufacture of a foil capacitor cut into unit blocks by a circular saw blade out of a capacitive strip. The saw rotates about an axis passing through a point of rotation that is offset from its center.

On two opposite flanks of the metal plates, the capacitive strip has metal plates. The direction of the feed or travel of the saw blade is substantially normal to the plates.

The rotational axis of the saw blade is either located in a median plane of the capacitive strip or offset with respect to the median plane. It is preferably above the median plane, when it is offset.

The direction of travel of the saw blade is either parallel to the median plane or oblique to it.

The saw blade has one or more teeth used for cutting on a part of its periphery that is furthest from the point of rotation. The rest of the periphery may have one or more teeth, or it may have no teeth.

The distance between the point of rotation and the center of the saw blade is greater than or equal to: $(1-k)\cdot A/N$, k being the percentage of periphery comprising one or more teeth used for cutting, A being the travel of the saw blade in millimeters per second and N being the speed of rotation of the saw blade in rotations per second.

BRIEF DESCRIPTION OF THE DRAWINGS

Other advantages and characteristics of the invention shall appear from the following description, illustrated by the appended drawings, of which.

In these figures, the same elements bear the same references. For reasons of clarity, the proportions are not maintained.

DETAILED DESCRIPTION OF THE PREFERRED EMBODIMENTS

Figure 1A:
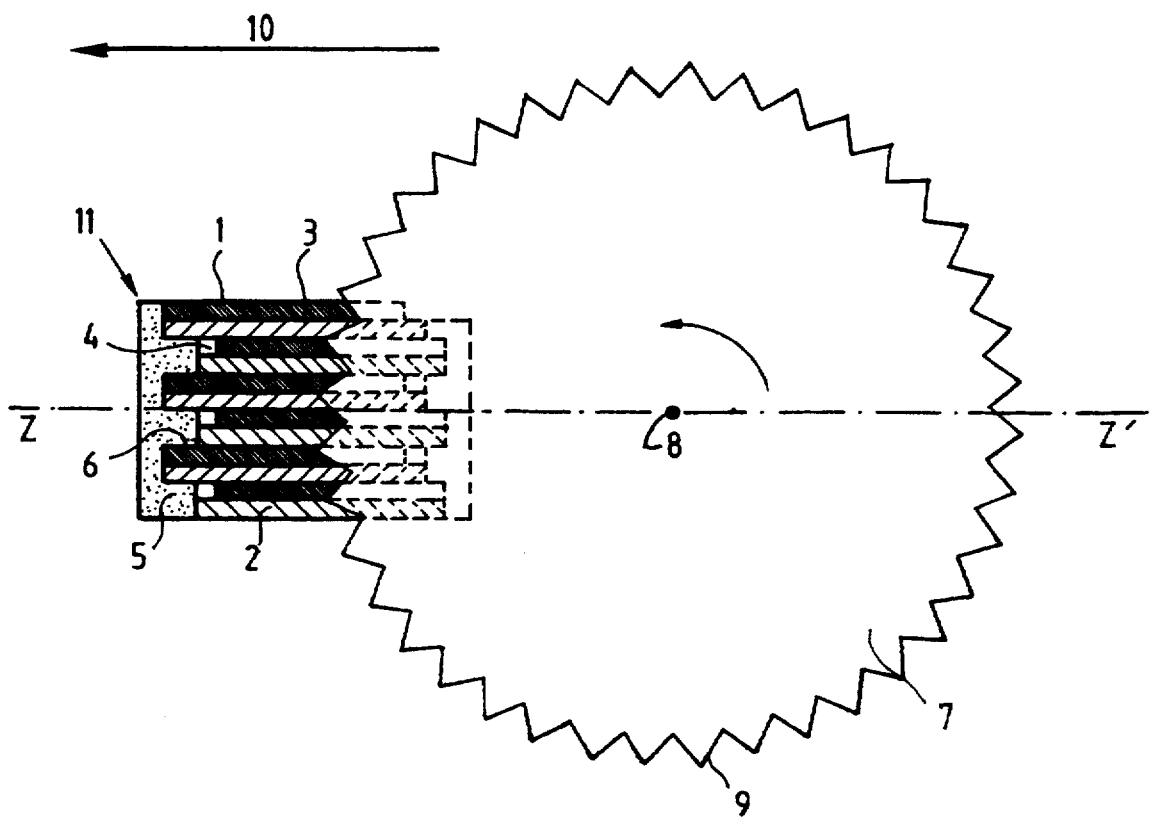
FIG. 1A shows a sectional view of a capacitive strip during the cutting operation according to a known method.
Figure 1B:
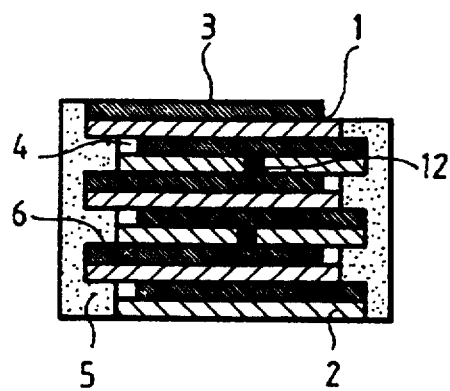
FIG. 1B shows a cut face of a capacitor obtained by the known method.

FIG. 1A shows a capacitive strip 11 during a standard cutting operation, in order to obtain a unit foil capacitor. FIG. 1B shows a cut face of the foil capacitor obtained.

The capacitive strip 11 has been made by the known technique of winding on a wide diameter wheel. The method uses dielectric films 1, 2 comprising, on one face, a metallized zone 3 and a non-metallized side margin 4. Two films are superimposed. One of the films 1, said to be an odd-order film, has its non-metallized margin 4 on one side. The other film 2, said to be an even-order film, has its margin 4 on the other side. At least one pair of films, superimposed in a determined number of turns, is wound on the wheel. There is obtained the capacitive strip 11, comprising alternating odd-order films 1 and even-order films 2. Then, each of the flanks of the capacitive strip 11 is covered with a metal or an alloy in order to make output plates 5. This operation is known as Schooping or Schoop's metal spraying process. Each plate 5 enables the metallizations of the same order (even-order or odd-order) films 1, 2 to be connected electrically and mechanically to one another. To improve the results of the Schooping operation, the odd-order films 1 may be offset with respect to the even-order films 2 during the winding operation. The offset bears the reference 6 and is called a salient or projecting feature.

The following operation consists in cutting the capacitive strip 11 into generally parallelepiped shaped unit blocks.

The cutting is done by a disk-shaped saw blade 7, the periphery of which comprises teeth 9. It rotates about an axis passing through its center 8. The axis is normal to the plane of the saw blade 7 and cannot be seen in FIG. 1A.

The shifting of the saw blade is substantially perpendicular to the plates 5. The sawing direction is referenced 10.

The center 8 of the saw blade 7 is substantially in a median plane of the capacitive strip 12. This plane passes through the axis ZZ' shown in FIG. 1A. It can be seen that the cutting surface is far from being perfect. Linking bridges 12 have formed between different order films 1 and 2. Each tooth 9 tears splinters out of the material of the capacitive strip 11. A portion of these splinters melts at the cutting surface and adds to the bonding of the films 1 and 2. Moreover, heating occurs during the cutting operation.

Another portion of the splinters is cut tree by the teeth 9 through centrifugal force, and through a suction system that is frequently provided for in this equipment. However, it happens that the process of the cutting free of splinters damages the cutting surface and thus creates linking bridges 12 which short circuit the different-order films 1, 2.

Figure 2A:
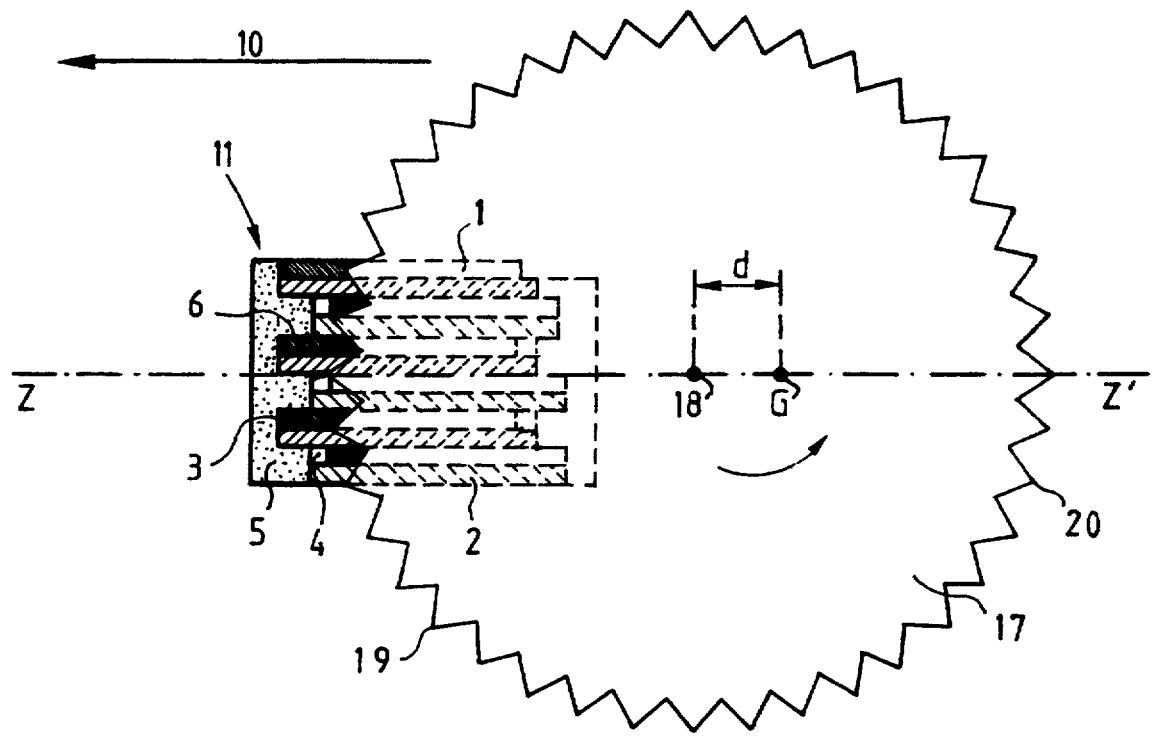
FIG. 2A shows a sectional view of a capacitive strip during the cutting operation by a method according to the invention.
Figure 2B:
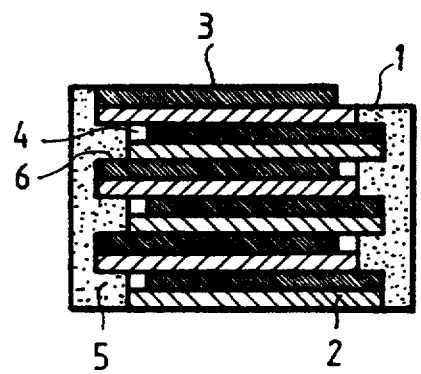
FIG. 2B shows a cut face of a capacitor, obtained by the method according to the invention.

FIG. 2A shows the cutting of a capacitive strip into unit foil capacitors by a method according to the invention. FIG. 2B shows a cut face of a foil capacitor obtained by the method.

The capacitive strip 11 is identical to that of FIG. 1A. The main difference pertains to the saw blade 17. It is still disk-shaped, with a radius R. The periphery of the disk has an indented edge which comprises teeth 19, 20. Instead of rotating about an axis that passes through the center 18 of the disk, it now rotates about an axis offset by a distance $\underline{d}$ with respect to the center 18. This axis is normal to the plane of the saw blade 17. It is represented by the point G.

The shifting of the saw blade 17 always takes place substantially perpendicularly to the plates 5. The direction of shift is indicated with the reference 10.

Figure 3:
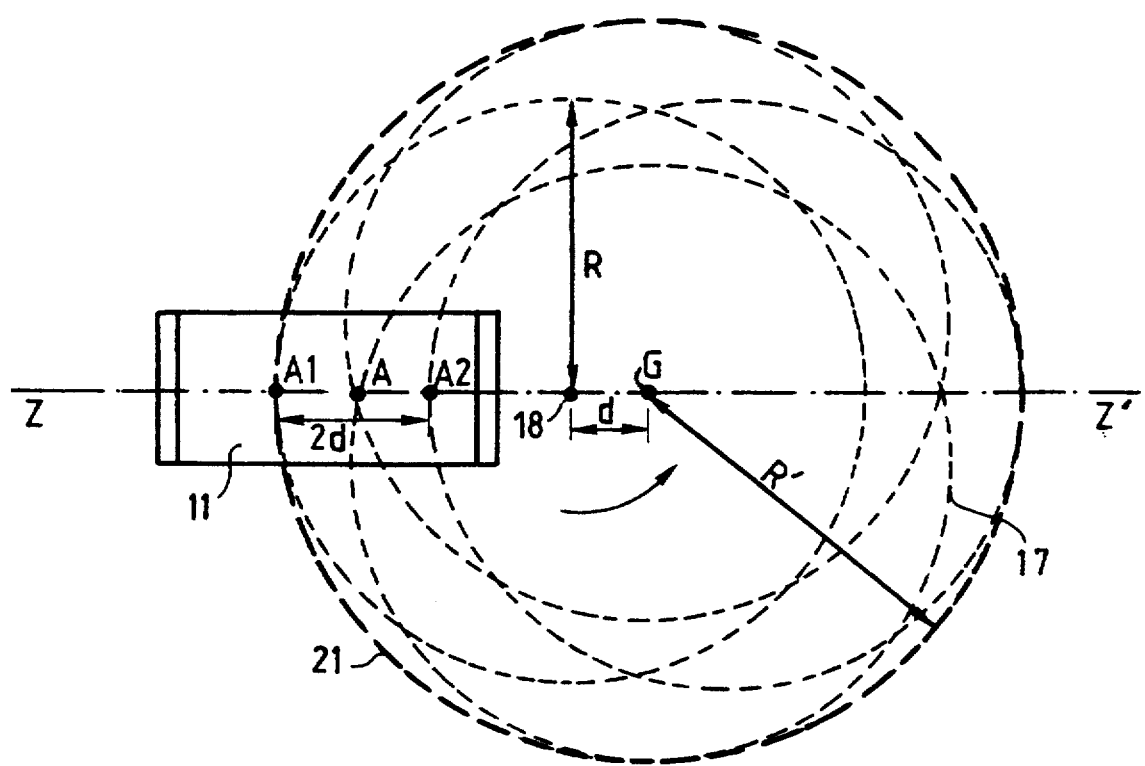
FIG. 3 shows the generatrix created by the motions of the saw blade during the cutting out of a capacitor obtained by the method according to the invention.

Referring to FIG. 3: the generatrix 21 generated by the rotation of the saw blade 17 is an enlarged circle. This circle has the following radius R':

$$R' = R + d$$

Through the offset of the rotation axis of the saw blade 17, a point A placed permanently on board the saw blade 17 will be driven by an oscillatory motion with an amplitude 2d along a fixed axis joining the point A to the point G. The point A will oscillate between a position A1 at a distance of R+d from the point G and a position A2 at a distance of R−d from the point G. The amplitude of the oscillation and the speed of the oscillation increase when $\underline{d}$ increases. In FIG. 3, the fixed axis is the axis ZZ' which goes through the median plane of the capacitive strip 11. This is only an example.

The dashed circles represent four different positions of the saw blade 17 during its rotation.

Through this oscillatory motion, each splinter is freed and removed entirely without damage to the cut surface of the capacitive strip 11. The short-circuits caused by the standard cutting operation described in FIGS. 1A and 1B are eliminated. In this configuration, only one or more teeth 19 actually work in the cutting operation. The other teeth 20 serve only to cut splinters free. The working teeth 19 are those that are furthest from the point of rotation G.

Figure 4:
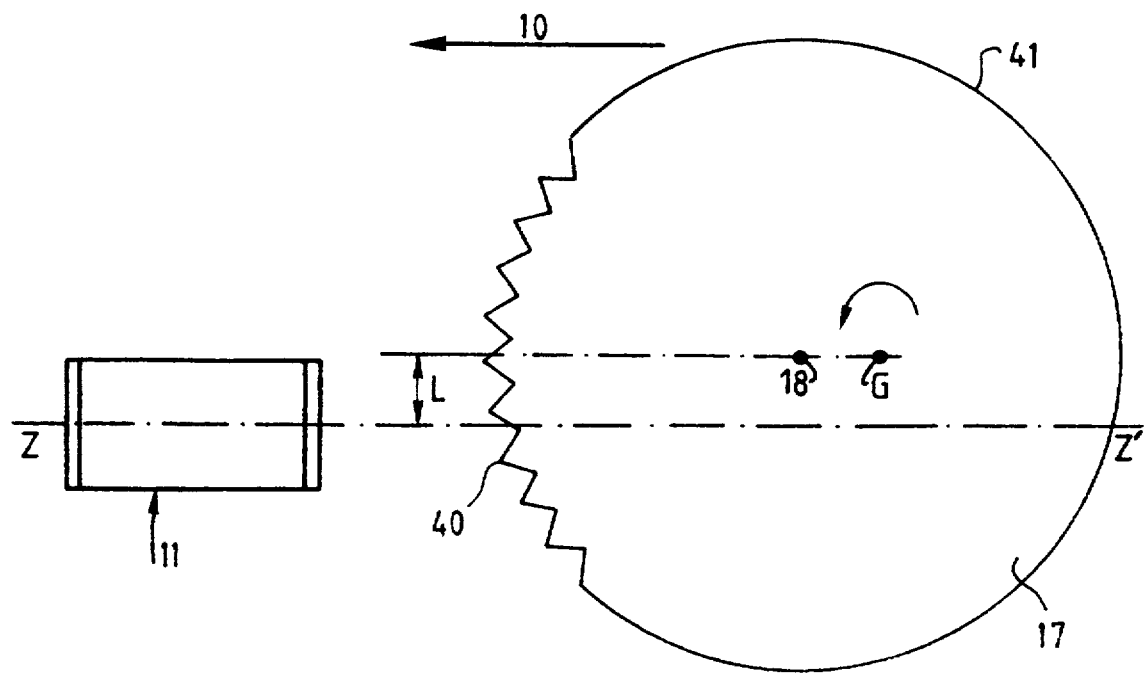
FIG. 4 shows a sectional view of a capacitive strip during the cutting operation, according to a variant of the method according to the invention.

Consequently, the saw blade 17 may include a set of teeth only on a part of its periphery. This is what is shown in FIG. 4. The teeth referenced 40 are located on the part of the periphery that is furthest from the point of rotation G. The rest 41 of the periphery does not have any teeth.

The teeth 40, in engaging and penetrating the material of the capacitive strip 11, cut splinters free. These splinters are then removed by the edge of the saw blade 17, even if this edge has no teeth.

According to another variant, shown also in FIG. 4, it may be imagined that the rotational axis and hence the point G are offset with respect to the median plane of the capacitive strip 11. Preferably, the rotational axis is located above the median plane of the capacitive strip 11, to further the removal of the splinters and to prevent the phenomenon of burrs. In the figure, it is at a distance L.

Figure 5:
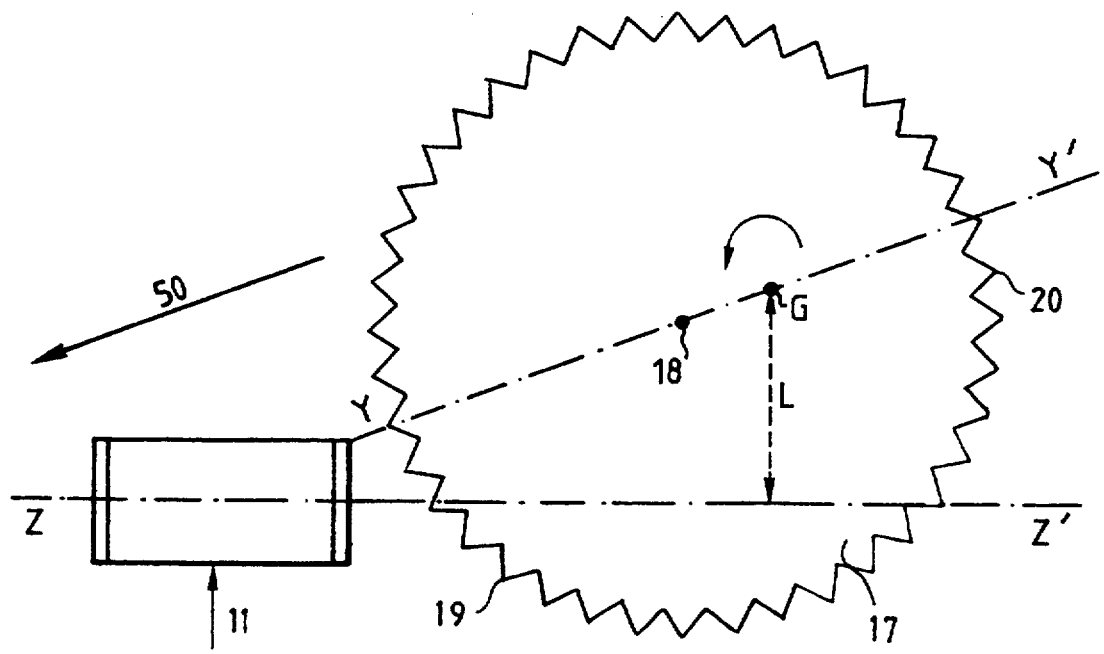
FIG. 5 shows a sectional view of a capacitive strip during the cutting operation, according to another variant of the method according to the invention.

The travel motion of the saw blade 17 takes place preferably in a direction 10 parallel to the median plane of the capacitive strip 11. It is possible to envisage a case where the travel takes place in a direction that is oblique to the median plane. FIG. 5 shows this variant. The direction of the travel motion, referenced 50, is a secant with the median plane of the capacitive strip 11. In FIG. 5, this direction 50 is substantially parallel to an axis, referenced YY', joining the point of rotation G to the point of penetration of the saw blade 17 into the capacitive strip 11. This point of penetration is an edge of the capacitive strip 11. It is quite possible to envisage other directions.

The manufacturing method according to the invention is entirely satisfactory if less than half of the periphery has teeth used for cutting.

With A representing the travel of the saw blade in millimeters per second, N its rotation speed in rotations per second, $\underline{d}$ the distance between the center of the saw blade and its point of rotation G, and k the percentage of periphery comprising teeth used for cutting, the distance $\underline{d}$ is greater than or equal to: $(1-k) \cdot A/N$.

Tests show that the best results are obtained when:
k = 15%
A = 100 mm/s
N = 9000 rpm, giving 150 rotations per second A distance $\underline{d}$ greater than or equal to 0.56 mm is obtained.

The saw blades commonly used have a diameter of about 100 mm.

What is claimed is:

1. A method for the manufacture of a foil capacitor, from a capacitive strip having a plurality of conductive foil layers and alternating dielectric layers which comprises:

offsetting a center of a circular saw blade, having an unilateral edge, from a point of rotation of the saw blade;

rotating the saw blade; and cutting the capacitive strip into unitary foil capacitors by the circular saw blade wherein the distance d between the center of the saw blade and the point of rotation is greater than or equal to $(1-k) \cdot A/N$ wherein k is the percentage of the periphery comprising one or more teeth used for cutting, A is the travel of the saw blade in millimeters per second and N is the speed of rotation of the saw blade in rotations per second.

2. A method for the manufacture of a foil capacitor according to claim 1, wherein the capacitive strip has metal plates on two opposite flanks, and which comprises:

moving the saw blade in a direction of travel which is substantially perpendicular to the plates.

3. A method for the manufacture of a foil capacitor according to one of the claims 1 or 2, which comprises locating the axis of rotation of the saw blade in a median plane of the capacitive strip to be cut.

4. A method for the manufacture of a foil capacitor according to one of the claims 1 or 2, which comprises offsetting the rotational axis of the saw blade with respect to a median plane of the capacitive strip to be cut.

5. A method for the manufacture of a foil capacitor according to claim 4, which comprises locating the axis of rotation of the saw blade above the median plane of the capacitive strip to be cut.

6. A method for the manufacture of a foil capacitor according to claim 1, which comprises moving the saw blade in a direction of travel substantially parallel to the median plane of the capacitive strip to be cut.

7. A method for the manufacture of a capacitor according to claim 1, which comprises moving the saw blade in a direction of travel oblique with respect to the median plane of the capacitive strip to be cut.

8. A method for the manufacture of a capacitor according to claim 1, wherein the saw blade comprises on a part of its periphery furthest from the point of rotation, one or more teeth used for cutting.

9. A method for the manufacture of a capacitor according to claim 8, wherein the rest of the periphery of the saw blade also comprises one or more teeth.

10. A method for the manufacture of a capacitor according to claim 8, wherein the rest of the periphery of the saw blade is free of teeth.

* * * * *